J. J. HARRELL.
ANIMAL SHEARS.
No. 343,240. Patented June 8, 1886.
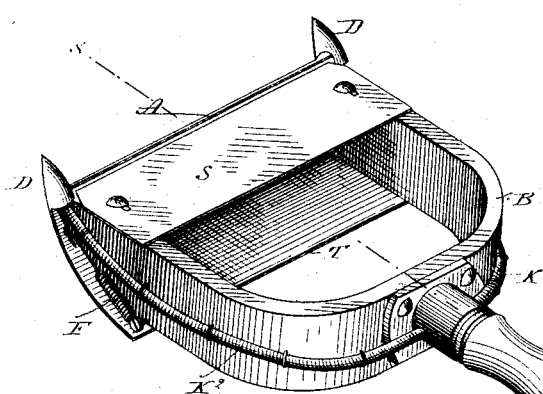
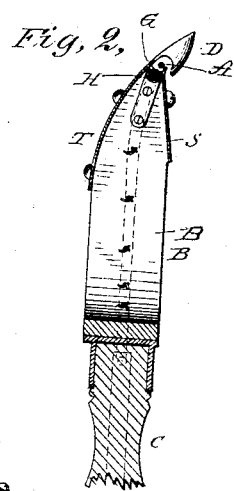
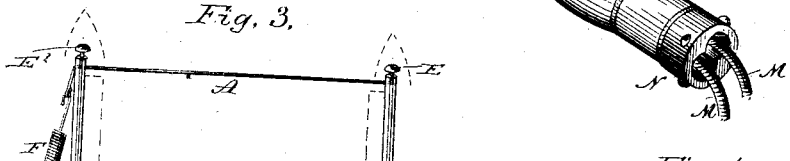
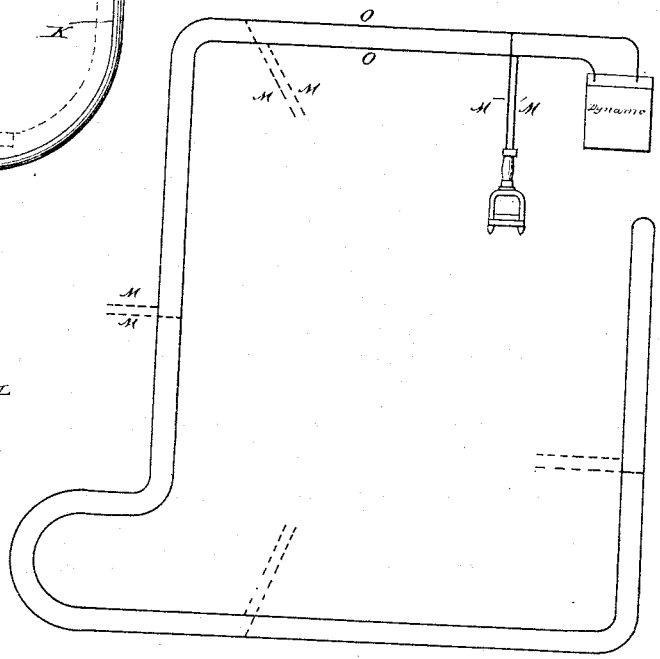
Witnesses:
Ernest Abshagen
Thos. Toomey
Inventor:
J. J. Harrell
By his Attorney:

UNITED STATES PATENT OFFICE.

JOSEPH J. HARRELL, OF AUSTIN, ASSIGNOR OF ONE-HALF TO J. M. WENDELKEN, OF DALLAS, TEXAS.

ANIMAL-SHEARS.

SPECIFICATION forming part of Letters Patent No. 343,240, dated June 8, 1886.

Application filed January 22, 1885. Serial No. 153,686. (No model.)

*To all whom it may concern:*

Be it known that I, JOSEPH J. HARRELL, a citizen of the United States, and a resident of Austin, in the county of Travis and State of Texas, have invented certain new and useful Animal-Shears, of which the following is a specification.

The object of my invention is to furnish a means of shearing or clipping sheep and other animals, that shall be cheaper, more economical, and more effective than the mechanical devices of cutting shears or knives heretofore employed. Heretofore the only means employed for this purpose has consisted of the well-known spring-shears or arrangements of reciprocating or revolving cutting knives or teeth operated by manual or other power. Such devices are clumsy and irregular in their action, and as at present constructed are liable to lacerate the flesh in attempts to cut the wool close to the body.

My invention provides a means that is free from the objections to the means and methods heretofore employed.

I have discovered by practical trials that the wool of sheep and other animals may be safely and expeditiously clipped by the employment of a platinum or other wire or conductor heated to a high temperature, sufficient to burn through the fibers of the wool or hair, and passed over the surface of the body as close as may be deemed desirable to the roots. No injurious effects are produced upon the animal or upon the wool or hair removed, while at the same time the same may be removed with great uniformity and expedition.

My invention consists in an improved appliance devised by me and hereinafter described and claimed, whereby sheep and other animals may be clipped by the employment of a platinum or other wire heated by an electrical current.

In the drawings, Figure 1 is a perspective view of a novel shearing appliance constructed in accordance with my invention. Fig. 2 is a section of a portion of the instrument on the line $xx$ of Fig. 1. Fig. 3 is a plan of the conductors in the instrument. Fig. 4 is a diagram of circuits.

A indicates a wire of platinum or other suitable refractory conductor designed to be heated by the passage of an electric current, and stretched or strung between suitable supports upon a portable holder, block, or support of any desired or convenient shape. The holder B here shown has the two prongs or arms, as shown, and is provided with a suitable handle, C, as indicated. The conductor or wire A is strung between the two dividing-points, D D, placed upon the holder and formed integral therewith or attached thereto, as hereinafter described.

At E is indicated a binding-post for clamping one end of the wire or conductor A. The other end of the wire passes over or through a second support or post, $E^2$, of any suitable kind, and is attached to a spring, F, by which an automatic tension is given to and preserved in the wire or conductor A, when the latter lengthens under the heating effects of the electric current. The wire is arranged just forward of the front edge of the lower surface, I, of the support and slightly above its edge. The surface I is formed integral with the holder, or preferably consists of an adjustable plate secured by screws passing through slots in the plate, so as to permit the plate to be adjusted backward or forward to or from the wire A. The plate I rests upon the surface over which the instrument is used, and serves to determine the distance from the surface at which the incandescing wire A shall sever the wool or hair. By adjusting the plate, the distance to which the wire A shall project beyond the edge may be determined. The plate I has preferably a curved surface to permit the instrument to more readily enter cavities or depressions, and the dividing-points D D may be formed upon it, as shown. The latter are also made hollow, so as to form a protection for the posts E $E^2$, or other supports upon which the ends of the wire A rest. Just above the front edge of the plate I a free space is provided, as shown, so that on the application of undue pressure to the wire A it may recede to a line with said edge, and thus be protected against injury. In this the upper plate or surface, S, assists. The latter is a clearing-plate, and is also preferably adjustable and arranged so that the plates converge toward their front edge. The plate S serves to turn off the hair or wool after its severance by the heated wire.

The wire A, as shown, is arranged parallel with the front edges of the plates and in front of the space between the edges. At the rear of the wire A is arranged a non-conducting backing, (indicated at G,) which serves not only to form a rest or support for the wire in case of the applications of undue pressure, but also to reflect the heat of the wire, so as to utilize the heating effects of the current to the fullest extent. The backing G is preferably of asbestus, and may be formed by packing asbestus fiber in a slotted tube, H, as indicated, or may be constructed in any other desired manner. The backing may be dispensed with without materially affecting the action of the device. The posts or supports for the end of the wire A are mounted upon, formed upon, or otherwise connected with the wires or plates K K², which are secured to the holder in any desired manner, and connect with flexible conductors M M in any desired manner. This connection is preferably secured by making the rods or plates K K² continuations of or attachments to conductors that are carried through openings in the handle C and terminate in binding-posts or other clamping devices, L L², at the butt of the handle, to which the ends of the flexible insulated conductors M M may be secured. A cap, N, of insulating material, is secured to the handle over the binding-posts, to protect them from accidental contact with foreign bodies. The openings for the conductors M M consist of conical holes in the head of the cap, this shape being adopted in order to avoid abrupt bends in the conductors near the points of attachment, and consequent liability to breakage. The flexible conductors M M connect with the leading and return wires O O from any suitable source of electricity—as, for instance, a dynamo-electric machine—and are made of convenient length to permit the device to be readily manipulated. A number of similar appliances might obviously be worked from the same supply-mains, O O, after the manner of incandescent electric lamps supplied in multiple arc from a pair of conductors. The form of the incandescent conductor is immaterial; but I prefer to make it of wire. It is made of high resistance, as are the conductors of incandescent electric lamps, and a current of sufficient strength is supplied to highly heat the same, so as to permit it to readily sever the fibers of wool or hair against which it is pressed. The form of the holder B is also obviously immaterial, and may be varied infinitely without departing from my invention, as may also the devices for forming electrical connection between the wire A and the flexible conductors M M.

I make no claim herein to the process of shearing sheep or other animals by an electric conductor heated to incandescence by an electric current, as this will form the subject of another application to be filed by me.

What I claim as my invention is—

1. A device for shearing sheep or other animals, consisting, essentially, of a holder carrying a stretched platinum or other conductor, and flexible electric conductors connecting the same with an electrical supply-conductor, as and for the purpose set forth.

2. In an electrical animal-shearing device, the combination, substantially as described, of a holder and a straight platinum wire or other conductor held between two or more dividing points or spurs on said holder, as and for the purpose set forth.

3. An electrical animal shearing or clipping device consisting, essentially, of the following parts: a platinum wire or other electric conductor mounted between suitable posts, a supporting-handle, and electrical connections to said conductors, carried through the handle and conveying the current from suitable flexible conductors, as and for the purpose set forth.

4. In an electrical shearing device, the combination of the incandescing conductor, a clearing plate or surface, and a suitable holder, as and for the purpose set forth.

5. In an electrical shearing device, the combination of a suitable holder provided with a curved under plate or surface, and an incandescing conductor mounted parallel with the edge of said plate, as and for the purpose set forth.

6. The combination, in an electric sheep-shearing device, of a suitable holder, a guiding under plate or surface, and the electric incandescing conductor fixed parallel with and slightly above the forward edge of said plate, as and for the purpose set forth.

7. In an electric sheep-shearing device, the combination of an incandescing conductor and a suitable holder therefor provided with a depression, groove, or slot behind and in line with the conductor, as and for the purpose set forth.

8. In an electric sheep-shearing device, the combination of an incandescing conductor, a holder, and a device, such as a spring, mounted on the holder and connected with said conductor, for automatically keeping the same under tension, as and for the purpose described.

9. In an electric sheep-shearing apparatus, the combination of an incandescing wire or conductor and a non-conducting backing suitably mounted parallel with and to the rear of said conductor, as and for the purpose described.

10. The combination of the incandescing conductor, the non-conducting backing of asbestus mounted parallel with the incandescing conductor and behind the same, as and for the purpose described.

11. The combination, in an electric animal-shearing device, of a bearing plate or surface, as I, and an incandescing wire or conductor mounted parallel with the edge thereof and in front of an open space, so that it may recede behind the line of the edge on the application of pressure, as and for the purpose described.

12. The combination, in an electric shearing apparatus, of two converging plates and an incandescing wire mounted parallel with their front edges and in front of the space between them, as and for the purpose described.

13. An electric animal-shearing device consisting, essentially, of an incandesing conductor mounted on a portable holder provided with a suitable handle, flexible conductors, binding-posts, to which the conductors are connected, and a non-conducting cap upon the butt of the handle and inclosing said binding-posts, as and for the purpose described.

14. The combination, with the handle and the binding-posts mounted on the butt, of the cap-piece, the conical openings, and the flexible conductors, as and for the purpose described.

15. The combination, for an electric animal-shearing apparatus, of a portable holder provided with a binding-post, a straight incandescing wire or strip attached at one end thereto, a conducting post or support for the other end of the wire or strip, binding-posts carried by the apparatus and adapted to receive the terminals of flexible conductor, and suitable conductors connecting said binding-post with the posts or supports for the wire or strip, as and for the purpose described.

16. As a new article of manufacture, an electric sheep-shearer consisting, essentially, of an incandescing wire or conductor strung on a portable holder or support provided with means for the attachment of a flexible leading and return conductor, as and for the purpose described.

17. An electric sheep-shearer consisting of a portable holder provided at its corners with the dividing-points and means for supporting an incandescing wire or conductor on a line between said points and parallel with the edge of the holder, as set forth.

Signed at New York, in the county of New York and State of New York, this 13th day of January, A. D. 1885.

JOSEPH J. HARRELL.

Witnesses:
THOS. TOOMEY,
GEO. C. COFFIN.